United States Patent [19]

Hakka

[11] Patent Number: 5,019,361
[45] Date of Patent: May 28, 1991

[54] REMOVAL AND RECOVERY OF SULPHUR DIOXIDE FROM GAS STREAMS

[75] Inventor: Leo E. Hakka, Dollard des Ormeaux, Canada

[73] Assignee: Union Carbide Canada Limited, Danbury, Conn.

[21] Appl. No.: 360,404

[22] Filed: Jun. 2, 1989

Related U.S. Application Data

[63] Continuation-in-part of Ser. No. 273,028, Nov. 19, 1988, abandoned.

[30] Foreign Application Priority Data

Nov. 9, 1988 [CA] Canada .................................. 582,680

[51] Int. Cl.$^5$ ........................ C01B 17/00; C01B 17/16; C01B 31/20
[52] U.S. Cl. .................................... 423/243; 423/228; 423/229
[58] Field of Search ........................ 423/243, 228, 229

[56] References Cited

U.S. PATENT DOCUMENTS

| | | |
|---|---|---|
| 2,106,446 | 1/1938 | Baehr et al. . |
| 2,186,453 | 1/1940 | Gleason et al. . |
| 3,904,735 | 9/1975 | Atwood et al. . |
| 4,067,703 | 1/1978 | Spink . |
| 4,122,149 | 10/1978 | Dunnery et al. . |
| 4,201,752 | 5/1980 | Kosseim et al. . |
| 4,208,387 | 6/1980 | Klass et al. . |
| 4,211,761 | 7/1980 | Tung . |
| 4,389,383 | 6/1983 | Sokolik, Jr. et al. . |
| 4,556,546 | 12/1985 | Burgoyre, Jr. et al. . |
| 4,659,553 | 4/1987 | Linde . |

FOREIGN PATENT DOCUMENTS

| | | |
|---|---|---|
| 1042135 | 11/1978 | Canada . |
| 1042364 | 11/1978 | Canada . |
| 1168027 | 5/1984 | Canada . |

OTHER PUBLICATIONS

Walker, et al., "Evaluation of Some Regenerable Sulfur Dioxide Absorbents for Flue Gas Desulfurization", Department of Energy, Jul. 1982.
Spink, "Handling Mists and Dusts", Chemtech, 6/88, pp. 364-368.
Marks, G. W., et al., "Diethylene Traimine and Other Amines as Agents for the Recovery of Sulphur Dioxide", Report of Investigations, U.S. Dept. of Interior, May 1937.

Primary Examiner—Gregory A. Heller
Attorney, Agent, or Firm—Paul W. Leuzzi, II

[57] ABSTRACT

Sulphur dioxide is removed from gas streams by contacting the gas stream with an absorbing medium containing less than about 80 wt. % of water and the spent absorbing medium subsequently is regenerated by removing absorbed $SO_2$. The absorbing medium comprises amine salt absorbent having at least two amine groups, at least one of which is a salt and at least one of which has a pKa of about 4.5 to 7.3. The absorption is at a temperature of less than about 60° C. The spent absorbing medium is regenerated under conditions such that at least one amine group remains in salt form.

30 Claims, 2 Drawing Sheets

REMOVAL AND RECOVERY OF SULPHUR DIOXIDE FROM GAS STREAMS

This is a continuation-in-part of U.S. patent application Ser. No. 273,028, Filed Nov. 19, 1988, now abandoned.

FIELD OF INVENTION

The present invention relates to the removal of sulphur dioxide from gas streams.

BACKGROUND TO THE INVENTION

Sulphur dioxide is emitted to the atmosphere from a variety of sources, including thermal generating plants, industrial boilers, metallurgical roasting operations, Claus sulphur plants and refineries, and is a primary source of so-called "acid rain". It has been estimated that as much as 26 million tons of sulphur dioxide is emitted to the atmosphere in North America per year and about 70% of the emissions in the United States originates from generating plants and industrial boilers.

A number of prior proposals have been made for the removal of sulphur dioxide from gas streams. In such procedures some form of absorbent is contacted with the sulphur dioxide laden gas in an absorber.

A wide variety of absorbents are in use or have been proposed, including dry limestone, limestone slurry, ammonia, lime, hydrated lime slurry, aqueous sodium hydroxide, aqueous soda ash or sodium sulphite, magnesia slurry, aqueous sodium citrate, aqueous alkanolamines, and copper oxide on alumina support. These materials all react with the acidic sulphur dioxide to remove it from the gas stream.

In principle, all these absorbents can be regenerated by the application of sufficient heat or chemical reagent, but, in practice, only the last five groups of materials have been used or have been proposed for regenerative processes. The regeneration method chosen depends to some extent on the absorbent material. Such regeneration procedures include steam stripping at about 90° C.; calcination at about 900° to 1000° C.; reduction with reductants such as hydrogen, methane and carbon monoxide; reaction with lime and electrodialysis/oxidation.

Currently, only four post-combustion sulphur dioxide-removal processes are widely proven and economically competitive, namely the lime/limestone slurry, lime spray dryer, dual alkali and Wellman-Lord processes. The former two procedures differ mainly in the method of gas/absorbent contacting, with venturi scrubbers or spray towers often being used in the slurry processes as opposed to a spray dryer in the latter. The dual alkali process uses a clear liquid sodium-based absorbent (sodium sulphite) to avoid the scaling and erosion problems of the limestone slurry process. The sodium values are recovered by reacting the $NaHSO_3$ produced with lime or limestone to produce insoluble calcium sulphite. All of these lime-based procedures produce calcium sulphite. No recovery of the removed sulphur dioxide is effected.

The Wellman-Lord process uses sodium sulphite as the absorbent, produces sulphur dioxide and recovers the sodium sulphite absorbent by thermally regenerating the sodium bisulphite-containing rich solvent in a steam evaporator.

One representative prior art process is described in U.S. Pat. No. 3,904,735, which describes the so-called "UCAP" (Union Carbide Alkanolamine Process) process. The UCAP process used alkanolamines, specifically triethanolamine, as the absorbent for the sulphur dioxide with desorption being effected by steam stripping. Refinements to the process are described in U.S. Pat. Nos. 4,122,149 and 4,389,383.

While the UCAP process used triethanolamine, U S. Pat. No. 3,904,735 discloses numerous other nitrogen-containing compounds for sulphur dioxide removal including other alkanolamines such as tripropanolamine and tributanolamine as well as tetrahydroxyethylalkylenediamines such as tetrahydroxy methylenediamine, tetrahydroxyethyl ethylenediamine, tetrahydroxyethyl-1,3-propylenediamine, tetrahydroxyethyl-1,2-propylenediamine, tetrahydroxyethyl-1,5-pentylenediamine. The patent provides no specific disclosure of the relative performance among the various amines, except that triethanolamine is the preferred alkanolamine and tetrahydroxyethyl ethylenediamine is the preferred tetrahydroxyalkyl alkylenediamine, nor is any working example specific to the use of any tetrahydroxyethyl alkylenediamine presented. At column 8, line 57, to column 9, line 38, the patentees disclose that the "nitrogen-containing compounds used as the absorbent solvents can be replaced by their corresponding sulphite." This sulphite is said to occur in situ as sulfur dioxide is absorbed by the nitrogen-containing compound and then recycling the amine to the absorption "at a level of about 0.5 moles of sulfur dioxide per mole of nitrogen-containing compound." At column 9, lines 36 to 38, tetrahydroxyethyl ethylenediamine sulphite is described to be a preferred nitrogen-containing compound.

Other representative prior art patents located through the search facilities of the United States Patent and Trademark Office are U.S. Pat. Nos. 2,106,446, 2,186,453, 4,208,387, 4,211,761, 4,556,546 and 4,659,553. The prior art patents referred to herein describe a variety of sulphur dioxide removal processes and themselves make reference to other representative prior art.

U.S. Pat. No. 2,106,446, identified above, discloses that gaseous weak acids, such as sulphur dioxide, can be absorbed from gases using a nitrogen base of the formula $A_1(A_2)N-B-N(A_3)A_4$ in which B is an aliphatic hydrocarbon radical which may also contain a simple or substituted amino-group and each A is hydrogen, alkyl or aryl with the proviso that at least one A is alkyl or aryl. The patentees state at column 2 lines 8 to 29:

> "The selection of the groups A is also of importance as regards the basicity. It is possible to decrease or increase the basic character of the compounds in a systematic manner by varying the groups A. For example the introduction of an alkyl group in the place of a hydrogen atom attached to a nitrogen atom weakens the basicity more than that of an alkylol group. Aromatic groups decrease the basic character still more. Comparatively weak bases of the said kind may be employed when it is desirable to remove a somewhat stronger gaseous acid by itself from the gas but to leave weaker gaseous acids therein. For example sulphur dioxide, which in aqueous solution is more strongly dissociated than carbon dioxide, may be washed out in the presence of the latter without the base being consumed for the absorption of the carbon dioxide. For the said purpose the base must be so weak that it will absorb the sulphur dioxide, but not the carbon dioxide, the sulphur dioxide being expelled again by heating."

The patent does not describe regeneration conditions, even in the three working examples. However, the patentees caution at column 1 of page 3:

"Even though the volatility of the said bases is very low as compared with that of the bases hitherto proposed, it is still advantageous to take precautions against loss of bases. Especially during the expelling process care should be taken that nothing is carried away mechanically from the base solution. When direct steam serves for the regeneration of the bases, the waste stream may be condensed and any volatilized bases recovered from the condensate."

The exemplified bases are dihydroxyethyl ethylenediamine, monohydroxymethyl diethylenetriamine and monomethyl-monohydroxylethyl triethylenetetramine.

Marks, et al, in a progress report entitled "Diethylene Triamine and Other amines as Agents for the Recovery of Sulphur Dioxide" in the May 1937 Progress Reports-Metallurgical Division, 17, Fixation of Sulphur from Smelter Smoke, Department of the Interior, United States Bureau of Mines, reports work with diethylenetriamine, triethylenetetramine and tetraethylenepentamine for absorption of sulphur dioxide. FIG. 17 reports both theoretical and experimental absorptions of sulphur dioxide per gram of either diethylenetriamine or triethylenetetramine at temperatures between about 20° and 100° C.

U.S. Pat. No. 4,201,752 references U.S. Pat. No. 3,904,735 and states that the use of monoethanolamine as a sulphur dioxide absorbent can represent advantages over the tertiary amine solvents disclosed in the earlier patent. A primary advantage of the monoethanolamine is in the reduced formation of heat stable salt ("HSS") build-up in comparison to triethanolamine. An estimate for one set of conditions was that the rate of HSS formation could be reduced to about one-sixth. HSS have anions such as sulphate, thiosulphate, dithionate, trithionate, and the like which tend to be more acidic than sulphite and thus more difficult to strip from the absorbing solution. Hence, purge streams are usually taken to remove HSS from cycling amine absorbent in order to prevent a build-up of the HSS. See, for instance, Canadian Patent No. 1,168,027.

Unfortunately, the formation of HSS is difficult to prevent in sulphur dioxide removal systems using amine absorbents. Often the gas being treated is an oxygen-containing gas and thus sulphite can be oxidized to sulphate, especially under the conditions of regeneration. Accordingly, amine solvents that can tolerate the presence of HSS without undue reduction on sorption efficiency and minimize the amount of purge that need be taken to maintain an acceptable level of HSS in the absorbing medium are sought. Moreover, amine solvents are sought that may reduce the rate of sulphite or bisulphite oxidation.

U.S. Pat. No. 2,186,453 summarizes other properties sought in absorbents: high capacity for the absorption of sulphur dioxide, ready and substantially complete release of the absorbed sulphur dioxide, little tendency to cause oxidation of the sulphur dioxide, low heat of absorption, high boiling point, low specific heat and high stability at temperatures required for the release of the sulphur dioxide. One major problem still plaguing previous commercial cyclic processes, however, is the capacity of the solvent to absorb sulphur dioxide which could subsequently be readily removed during steam stripping. Moreover, the temperatures that enable efficient stripping of the sulphur dioxide from the absorbing medium should not be unduly deleterious to the absorbent.

A further consideration in providing desirable sulphur dioxide removal processes is the ability to effectively remove sulphur dioxide to such low levels that the treated gas is acceptable for release to the environment. Often, the sulphur dioxide concentration in the treated gases must be less than about 500, e.g., often less than about 100, parts per million by volume (ppmv). Moreover, particularly with the stack gas streams and large volume smelter off-gases, the absorption process should not result in high energy consumption caused by pressure drop. Hence, desirable absorbents should be capable of effecting the sought absorption of sulphur dioxide in absorption units which offer little resistance to gas flow.

One such apparatus is known as the "Waterloo" scrubber and is described by Spink in "Handling Mists and Dusts", Chemtech, June, 1988, pages 364 to 368. U.S. Pat. No. 4,067,703 discloses a Waterloo scrubber for the removal of particulates. According to the article, U.S. patent application Ser. No. 20963, has been filed on the use of the Waterloo scrubber as a chemical reactor. The Waterloo scrubber comprises a duct in which the gas to be scrubbed flows and atomizing nozzles spray liquid into the passing gas stream. The gas then passes into a turbulent mixing zone (i.e., a slow moving centrifugal fan) which seems to agglomerate the liquid to provide larger droplets that can be readily separated from the system. An entrainment separation zone can follow the turbulent mixing zone for further recovery of liquid. Since much of the liquid can be removed in the turbulent mixing zone, the pressure drop caused by the entrainment separation zone is much less than if the entrainment separation zone was required to remove substantially all of the liquid.

In his article, Spink states that:
"The Waterloo $SO_2$ scrubber can remove more $SO_2$ at a much lower L/G [Liquid-to-Gas] ratio than other scrubbers while employing the same scrubbing media." (page 366)

He reports the use of ammonia, MgO-containing lime, sodium sulfite solution and iron oxide slurry as various reagents for sulphur dioxide removal. Clearly, a problem that must be addressed in the use of any amine-containing absorbent for use in a Waterloo scrubber is enhanced potential for vaporization and loss of the amine due to the high surface area per unit volume of the absorbing medium caused by the atomization.

SUMMARY OF INVENTION

By this invention, absorption/desorption processes for the removal and recovery of sulphur dioxide from gas streams are provided which use amine absorption solvents. The processes of this invention often are characterized as having energy efficient absorption and regeneration and desirably low loss of effective absorption solvent, e.g., due to vaporization and/or the generation of heat stable salts. Moreover, preferred processes are able to reduce effectively sulphur dioxide content of gases to less than 500, or less than 100, ppmv.

In a broad aspect of the invention, a gas stream containing sulphur dioxide is contacted with an absorbing medium containing (i) water and (ii) an amine salt absorbent (amine sorbent) having at least two amine groups, at least one of which is a salt and at least one of which, when in its free form, is a group having a pKa, in an aqueous medium at 25° C., of about 4.5 to 7.3. A pKa is the negative logarithm of the ionization constant of the conjugate acid of the base. The latter amine group is referred to herein as a "sorbing nitrogen". The temperature of the contacting is at a temperature of up to about 60° C. to produce a spent absorbing medium containing reversibly absorbed sulphur dioxide in an amount of at least about 100 grams of sulphur dioxide per kilogram of absorbing medium. Sulphur dioxide is stripped from the spent absorbing medium at a temperature and pressure sufficient to remove sulphur dioxide and provide a regenerated absorbing medium containing absorbent having at least one nitrogen as an amine salt and at least one free sorbing nitrogen. The desorbed sulphur dioxide is recovered and the regenerated absorbing medium is recycled to contact the gas stream.

In accordance with another aspect of the present invention, the aqueous absorbing medium contains a water-soluble half salt of a diamine. Such diamines, in their free base form, preferably have a molecular weight of less than about 300 and while in their half-salt form, have a pKa value for the sorbing nitrogen of about 5.0 to about 7.3.

The aqueous absorbing medium contains at least one mole of water for each mole of sulphur dioxide to be absorbed and comprises less than about 80 wt. % of water.

Often the sulphur dioxide-containing gas stream is contacted with the absorbing medium at substantially atmospheric pressure and at a temperature of about 10° to about 60° C., yet a relatively high loading of sulphur dioxide in the absorbing medium can be obtained, namely at least about 100 grams of sulphur dioxide per kilogram of absorbing medium.

The absorbed sulphur dioxide is recovered from the spent absorbing medium by stripping at a temperature of up to about 110° C., e.g., about 50° to about 110° C. and at least about 30° C. greater than the contact temperature to form the regenerated aqueous absorbing medium.

GENERAL DESCRIPTION OF THE INVENTION

The present invention relates to processes which enable a high loading of recoverable sulphur dioxide in an absorbing medium to be achieved. The high sulphur dioxide loading enables significantly smaller equipment to be employed and a considerable economy of capital and operating costs to be achieved. Moreover, the processes of this invention minimize the adverse effect of heat stable salt formation and minimize the vaporization of the amine sorbent, thereby facilitating conducting the processes in low pressure drop scrubbers in which the absorbing medium may be in the form of fine droplets. Advantageously, the amine sorbent need not be rendered highly viscous due to the presence of an unduly high molecular weight amine (wherein the molecular weight would serve to reduce vaporization) in amounts required to obtain desired sulphur dioxide loading capacities. The sulphur dioxide recovered from the stripping operation may be sold as such or converted into sulphuric acid or elemental sulphur or other sulphur compound(s) as desired.

At least one amine salt absorbent is used in the processes of this invention which has at least two amine groups, at least one of which is in the form of a salt and at least one other of which ("sorbing nitrogen") exhibits a pKa of between about 4.5 and 6.7. Because the pKa of an amine varies with temperature, for the sake of uniformity, all pKa measurements are made at 25° C. in an aqueous medium. Both of the amine groups should be capable of conversion to ammonium salts in the presence of sulphur dioxide. As is generally the case, protonating the first amine group will occur under more basic conditions than that when the second amine group is protonated, e.g., the pKa for one amine group will be higher than that for the other, that is, the sorbing nitrogen. Protonating one amine results in an electron withdrawing effect on closely proximate, e.g., amine groups, reducing the pKa for the proximate amine. In accordance with the processes of this invention, the first protonated amine group, which is thus a stronger amine group, often is maintained in the salt form. The amine salt, e.g., half salt in the case of diamines, often is substantially non-volatile, so that the amine is not lost during the sulphur dioxide absorption or subsequent regeneration.

The amine salt may be formed prior to introducing fresh absorbing medium into the cyclic sulphur dioxide removal system or it can be formed in situ in the system by reaction with sulphur dioxide. Most advantageously, the anion is one or more sulphur-containing oxyanions, e.g., hydrogen sulphite, sulphite, pyrosulfite, sulphate, thiosulfate, etc. In operations in which sulphite or bisulphite oxidation can occur, due to the stronger acidity associated with sulphate anion, the salt will tend to be sulphate salt. Since at least one anion group is to remain in the salt form during regeneration, the absorbing medium can accommodate substantial amounts of heat stable salt without reduction in effectiveness.

Generally, in the absorbing medium the amine salt absorbent comprises at least about 50, preferably at least 70, e.g., 75 to essentially 100 mole percent of the total amine capable of absorbing sulphur dioxide.

Because of availability and lower molecular weight, diamines are preferred for the amine salt absorbent. Advantageous diamines (in free amine form) can be represented by the structural formula:

wherein $R^1$ is alkylene of two or three carbon atoms, $R^2$, $R^3$, $R^4$, and $R^5$ may be the same or different and can be hydrogen, alkyl (e.g., lower alkyl of 1 to about 8 carbon atoms including cycloalkyls), hydroxyalkyl (e.g., lower hydroxy alkyl of 2 to about 8 carbon atoms), aralkyl (say, 7 to about 20 carbon atoms), aryl (often monocyclic or bicyclic), alkaryl (say, 7 to about 20 carbon atoms), and any of $R^2$, $R^3$, $R^4$, and $R^5$ may form cyclic structures. Diamines are organic compounds containing two nitrogen atoms, and are often preferred due to their commercial availability and generally lower viscosity. The amines, e.g., diamines preferably are tertiary diamines, in view of their stability. However, other diamines in which one or both of the nitrogens is primary or secondary and which otherwise meet the critical parameters discussed below may be employed, provided mild oxidative or thermal conditions exist to minimize chemical reaction of the solvent. Often, the preferred amine salt absorbents have a hydroxyalkyl group as a substituent on an amine group. In some instances, the hydroxy substituent is believed to retard the oxidation of sulphite or bisulphite to sulphate.

To enable a high loading of recoverable sulphur dioxide to be absorbed in the absorbing medium under atmospheric pressure conditions, it is preferable for the free amine form of the amine salt absorbent to have a molecular weight less than about 300, preferably less than about 250. Often the tertiary diamines are of the formula:

wherein $R_1$ is an alkylene group, preferably containing from 2 to 3 carbon atoms as a straight chain or as a branched chain, and each $R_2$ is the same or different and is an alkyl group, preferably methyl or ethyl, or a hydroxy-alkyl group, preferably 2-hydroxyethyl. Specifically preferred compounds are N,N'N'-(trimethyl)-N-(2-hydroxyethyl)-ethylenediamine ($pKa=5.7$); N,N,N',N'-tetramethylethylenediamine ($pKa=6.1$). N,N,N',N'-tetrakis (2-hydroxyethyl) ethylenediamine ($pKa=4.9$); N-(2-hydroxyethyl) ethylenediamine ($pKa=6.8$); N,N'-dimethylpiperazine ($pKa=4.8$); N,N,N',N'-tetrakis (2-hydroxyethyl)-1,3-diaminopropane; and N',N'-dimethyl-N,N-bis(2-hydroxyethyl) ethylenediamine. Also included among the useful diamines are heterocyclic compounds, such as piperazine ($pKa=5.8$). The pKa values are for the sorbing nitrogen.

The absorbing medium contains at least one mole of water and usually more for each mole of sulphur dioxide to be removed from the gas stream. The water acts both as a solvent for the amine salt and as an absorber for the sulphur dioxide. The proportion of water present is up to about 80 weight percent of the absorbing medium, preferably about 25 to about 50 weight percent of the absorbing medium.

It is not essential that the amine salt absorbent and water be miscible under any of the conditions of the process, nor is it essential that the amine salt absorbent be liquid under all the conditions of the process. Frequently, the solubility of the amine salt absorbent in water is at least about 0.01, often at least about 0.1, mole per liter at 25° C. Preferably, the amine salt absorbent is miscible with water under the conditions in the process.

The amine salt absorbent (calculated as the free amine) often comprises at least about 20 weight percent of the absorbing medium, e.g., about 20 to 90, say, about 25 to 75, weight percent of the absorbing medium. The amount of amine salt absorbent is preferably in an amount sufficient to provide a spent absorbing medium containing at least about 100 grams of sulphur dioxide per kilogram of absorbing medium. The amount of amine salt absorbent, however, should not be so great as to either (a) unduly increase the viscosity of the absorbing medium such that undesirable pressure drops are incurred in the gas stream passing through an absorber vessel or (b) render the absorbing medium difficult to atomize, in say, a Waterloo scrubber. Preferably, the viscosity of the absorbing medium is below about 1200 centipoise at 25° C., e.g., between about 1 and 500 centipoise at 25° C.

The absorbing medium may contain mixtures of amine salt absorbents and/or mixtures of amine salt absorbents with other amine absorbents such as triethanolamine, dimethylaniline, xylidines, monoethanolamine and diethanolamine. Other components, e.g., alkali salts, may be present as additives to, for instance, retard sulphite or bisulphite oxidation, maintain pH and serve as cosolvents.

The absorbing medium is contacted with the gas containing the sulphur dioxide. Any convenient gas-liquid contacting apparatus may be used. Illustrative contacting devices include countercurrent absorption columns including packed columns and tray columns; countercurrent or cocurrent spray columns including Waterloo scrubbers; venturi scrubbers; thin film contactors and semipermeable membranes.

The amount of absorbing medium employed per unit volume of gas and contact time are at least sufficient to effect removal of substantially all the sulphur dioxide from the gas stream, or to leave a desired residual amount, e.g., less than 500 ppmv, preferably less than 200 ppmv, even less than 100 ppmv, sulphur dioxide. The process is applicable to any sulphur dioxide containing gas stream, e.g., up to 20 or 50 volume percent sulphur dioxide, but is particularly useful for application to flue gas streams from thermal generating plants, which contain about 700 to about 5000 ppmv sulphur dioxide, typically about 1000 to 3000 ppmv sulphur dioxide. In a preferred embodiment, the gas stream to be contacted with the absorbing medium is at least about at 90 percent saturation with water to prevent undue dehydration of the absorbing medium. Advantageously, the gas is relatively free from particulates such as fly ash to minimize fouling of the gas-liquid contact equipment or providing materials that might catalyze the oxidation of sulphite or bisulphite.

The contact of the absorbing medium with the sulphur dioxide-containing gas stream is effected within the temperature range of up to about 60° C., often about 10° to about 60° C., preferably about 10° to about 50° C., and is effected to obtain a loading of sulphur dioxide of at least 100 grams of sulphur dioxide per kilogram of absorbing medium, preferably about 200 to about 400.

Without wishing to be limited to theory, it is believed that when sulphur dioxide is dissolved in water, bisulphite ion is formed. The bisulphite ion is then ionically associated with the sorbing nitrogen of the amine salt absorbent. In order to effect high removal of the sulphur dioxide and energy efficient regeneration, the pH of the absorbing medium should be maintained such that the bisulphite/sulphite equilibrium favors bisulphite in the spent absorbing medium. To a significant extent, the amine salt absorbents with a pKa in the range of about 4.5 to 7.3, tend to buffer the spent absorbing medium in a range favoring the presence of bisulphite, e.g., a pH of about 4 to 6.

The pH of the absorbing medium is generally in the range of about 4 to about 7.5 during the adsorption process. Usually the absorbing medium initially has a pH close to the upper end of this range, preferably about 6.5 to about 7.5, and, as sulphur dioxide is absorbed and the solution tends to become more acidic, the pH moves towards the lower end of the range.

If the absorbing medium has a higher pH, then the sulphur dioxide is absorbed as sulphite ion and stripping of a significant proportion of the absorbed sulphur dioxide thereby becomes difficult to achieve. If the pH is too low, then little sulphur dioxide is absorbed under normal atmospheric pressure conditions from the dilute sulphur dioxide gas streams normally encountered.

In order to enhance the removal of sulphur dioxide and facilitate stripping and regeneration of the amine salt absorbent, a low temperature for the absorption which enables significant absorption of sulphur dioxide is most desired. As the absorption temperature is increased, the amount of sulphur dioxide absorbed per mole equivalents of sorbing nitrogen is decreased. Advantageously, the amine salt absorbents used in the processes of this invention, given their pKa values of between about 4.5 and 7.3, are relatively weak bases and hence can be regenerated with less energy consumption and at a lower temperature than are stronger bases. To provide sufficient sulphur dioxide absorption, a temperature is preferably used which, under "reference conditions", enables at least about 0.5, preferably at least about 0.7, mole of sulphur dioxide to be reversibly absorbed per mole equivalent of sorbing nitrogen. Reference conditions are intended to provide a guide for the selection of the maximum preferred temperature of the absorption and do not necessarily relate to the specific conditions that may be present in the absorption system. Reference conditions are defined as using a feed stream having a partial pressure of 2 millimeters of mercury of sulphur dioxide.

The time of contact between the gas and absorbing liquid will depend upon the intimacy of contact between the phases and the rate of transfer of the sulphur dioxide into the liquid phase. For spray-type scrubbers, the contact time may be less than 1 or 2 seconds. With absorption columns, the contact time may be 30 seconds or more. The pressure may vary widely, e.g., from subatmospheric to superatmospheric pressures. Since higher pressures increase the partial pressure of a given amount of sulphur dioxide, they are favored from a thermodynamic standpoint. However, in many instances the gas to be treated is at a pressure slightly higher or lower than the ambient pressure and raising the pressure is economically undesirable. The processes of this invention, however, are advantageous at near ambient pressure, i.e., within 0.5, e.g., within 0.1, atmosphere of the ambient pressure.

The ability to obtain a high degree of loading combined with the ability subsequently to remove all the absorbed sulphur dioxide leads to a highly economic process in terms of both capital and operating cost.

Removal (recovery) of the absorbed sulphur dioxide from the spent absorbing medium to regenerate the absorbing medium and to provide the sulphur dioxide as a concentrated gas stream is effected in any convenient manner. The desorption is conducted under desorptive conditions comprising a temperature and pressure sufficient to remove at least about 70 mole percent of the sulphur dioxide absorbed in the spent absorbing medium (i.e., absorbed on the sorbing nitrogens) to provide a regenerated absorbing medium containing amine salt absorbent having at least one nitrogen as an amine salt and at least one free sorbing nitrogen. The salt often is at least one of sulphate, chloride, thiosulfate, dithionate, trithionate and pyrosulfite. Advantageously, at least about 90 mole percent, preferably essentially 100 mole percent, of the amine salt absorbent has at least one nitrogen in the salt form in the regenerated absorbing medium. It is generally desirable to maintain a differential in temperature between the absorption and desorption steps of at least about 30° C., and the desorption temperature is frequently less than about 110° C., e.g., about 50° C. to about 110° C., to provide a driving force for the desorption.

Desorption is typically effected by gaseous stripping using steam generated in situ or by passing an inert gas through the spent absorbing medium, usually at near atmospheric pressure. Lower pressures somewhat favor desorption. The amount of stripping gas may vary from 0 to about 100 liters per liter of absorbing medium. During stripping, the ammonium salt at the sorbing nitrogen is returned to it basic form while sulphur dioxide, thought to be present as bisulphite ions in the spent absorbing medium, is released from the aqueous medium as gaseous sulphur dioxide. For an economic cyclic process, the ratio of sulphur dioxide absorbed to sulphur dioxide desorbed is about 1:1. During stripping, the pH of the solution usually rises as the acidic sulphur dioxide is removed. As noted earlier, since the amine salt is relatively non-volatile, it resists volatilization during stripping. In advantageous aspects of this invention, the amount of steam required per unit of sulphur dioxide recovered can be substantially less than the amount required in typical commercial processes (e.g., in the range of about 4 to 10 kilograms of steam per kilogram of sulphur dioxide recovered). Often, the amount of steam required is less than about 5, preferably less than about 4, kilograms of steam per kilogram of sulphur dioxide recovered.

The stripped, regenerated absorbing medium containing the amine salt absorbent is recycled to the absorbing step, while the gaseous sulphur dioxide is further processed as desired. For example, the sulphur dioxide may be converted into sulphuric acid for sale as a by-product of the process.

DESCRIPTION OF PREFERRED EMBODIMENT

Figure 1:
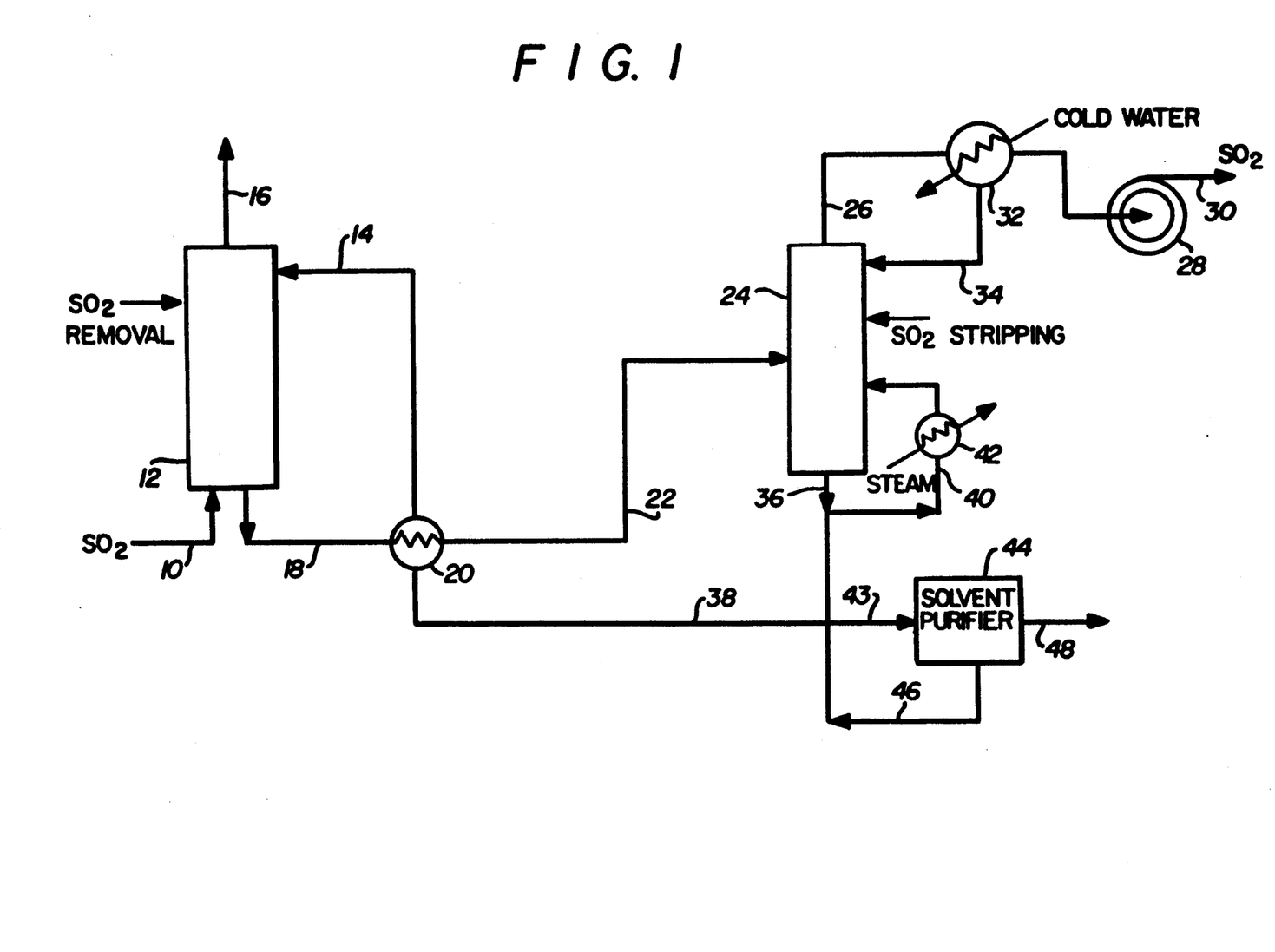
FIG. 1 is a simplified flow sheet of a cyclic process according to one embodiment of the invention.

FIG. 1 shows a schematic flow sheet of a sulphur dioxide removal and regeneration process in accordance with one embodiment of the invention.

A sulphur dioxide-laden gas stream in line 10 is fed to a gas-liquid contact apparatus 12 wherein the gas stream is contacted with recycled aqueous absorbing medium fed to the contact apparatus 12 by line 14 to effect absorption of sulphur dioxide from the gas stream, so as to form a sulphur dioxide-depleted product gas stream which leaves the contact apparatus 12 by line 16 for further processing as desired, before venting via a chimney, a flare stack or the like. Any desired form of gas-liquid contacting apparatus may be employed consistent with the aim of efficiently removing sulphur dioxide from the gas stream and absorption in the absorbing medium. A spray-type contacting-device having a low pressure drop, such as a Waterloo scrubber, is preferred.

Spent absorbing medium containing dissolved sulphur dioxide is removed from the contact apparatus 12 by line 18 and, after passing through a lean-rich heat exchanger 20 to heat lean solvent in line 14, is passed by line 22 to a stripping apparatus 24.

The stripping apparatus, which commonly takes the form of a packed or tray column, communicates by line 26 to a vacuum pump 28 to maintain the stripping column 24 under a subatmospheric pressure and to discharge recovered sulphur dioxide from the system by line 30. The product gas stream in line 26 passes through a heat exchanger 32 fed by cold wager to condense water from the product gas stream for recycle by line 34 to the stripping column 24.

Regenerated absorbing medium is recovered from the stripping column by line 36 and is recycled by line 38 to the heat exchanger 20 and, from there, to line 14. A portion of the regenerated absorbing medium in line 36 is recycled by line 40 through a reboiler 42 to the stripping column 24 to maintain the stripping column at the regeneration temperature.

The process may produce heat stable salts by oxidation or disproportionation of the sulphur dioxide and these salts accumulate in the cyclic system. These salts may be removed by diverting a portion of the regenerated absorbing medium in line 36 to a solvent purifier system 44 by line 43.

The purified solvent is recycled to line 38 by line 46 and the removed heat stable salts are removed by line 48. Any desired procedure may be employed to effect removal of heat stable salts, such as reaction with lime or hydrated lime, ion exchange or by the addition of strong base followed by distillation of free amine.

The procedure is cyclic in operation, with absorbing medium cycling between absorption and desorption of sulphur dioxide to provide purified stack gases and a concentrated sulphur dioxide stream for further processing.

EXAMPLES

Example 1

This examples illustrates the determination of the titration curve for a diamine useful in the present invention.

Figure 2:
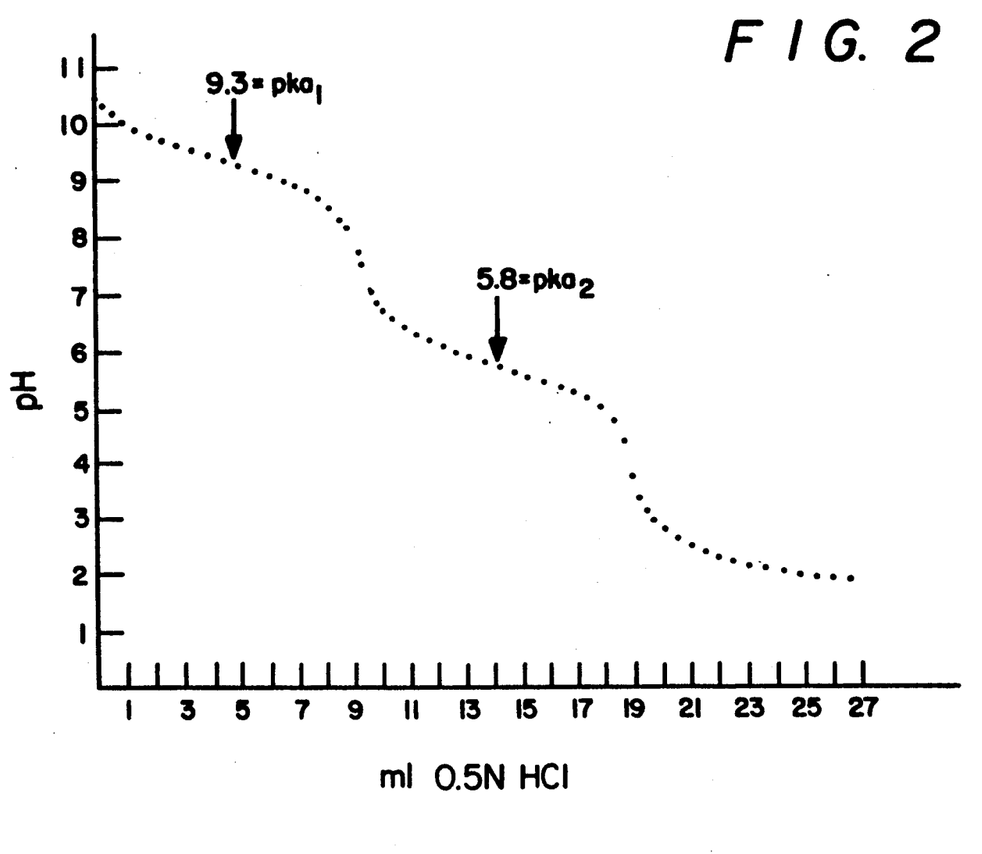
FIG. 2 is a titration curve.

An aqueous solution of piperazine was titrated with 0.5 N HCl in 0.5 milliliter steps and the pH of the solution determined. The results were plotted graphically and the results appear in FIG. 2.

The $pKa_1$ and $pKa_2$ values (i.e., the pKa values for the first and second nitrogen atoms) were determined to be 9.3 and 5.8, respectively. As can be seen from the curve of FIG. 2, salt formation occurs as acid is added until the first nitrogen atom is fully neutralized and a break occurs in the graph. Addition of further acid then causes further salt formation until the second nitrogen atom also is fully neutralized and again a break occurs in the graph.

Example 2

This example illustrates the ability to regenerate $SO_2$ from the absorbing medium which is essential to the satisfactory operation of an absorption-desorption cyclic process.

To a three neck, 200 milliliter round bottom glass flask was added 60 grams of diamine and 60 grams of water and the flask, including a magnetic stirring bar, was weighed. The flask then was fitted with a thermometer, a condenser and a glass gas sparger. The solution was saturated by bubbling in $SO_2$ gas while stirring. The flask was weighed after saturation to confirm that at least 1 mole of $SO_2$ was dissolved per equivalent of amine. The saturation was conducted at a temperature of about 40° C.

The gas sparger then was replaced by a glass stopper and heat was applied to the flask by a heating mantle. Vacuum was applied to the flask through the condenser and the pressure was maintained at 300 mm mercury absolute. Heating was continued until the temperature of the liquid in the flask reached 79° to 81° C. and rapid refluxing of water was noted. Refluxing was continued for 5 minutes, at the end of which time heating was discontinued, the flask was repressurized to atmospheric pressure and the flask cooled.

The flask was again weighed to determine the weight of $SO_2$ remaining in solution. The $SO_2$ loading of the stripped solution was then calculated in terms of moles of $SO_2$ per mole of amine, as follows:

$$\text{moles } SO_2 \text{ remaining after stripping} = \frac{\text{wt. of } SO_2 \text{ remaining after stripping}/64.1}{60/\text{molecular weight of amine}}$$

For a variety of amines, the results set forth in the following Table I were obtained. The pKa values of the half-salt ($pKa_2$) also are given, except for triethanolamine (prior art) which is a mono-amine, so that it is the $pKa_1$ value which is given. N,N'-bis(2-hydroxyethyl)-piperazine is also comparative.

TABLE I

| Amine | $pKa_2$ | Lean Loading (mole/mole) |
|---|---|---|
| Triethanolamine | 7.76 | 0.93 |
| N,N,N',N'-tetrakis (2-hydroxyethyl) -1,3-diaminopropane | 6.9 | 1.9 |
| N,N,N',N'-tetramethyl-ethylenediamine | 6.1 | 1.86 |
| N,N',N'-trimethyl-N(2-hydroxyethyl) ethylenediamine | 5.7 | 1.78 |
| Piperazine | 5.8 | 1.76 |
| N,N'-dimethyl piperazine | 4.8 | 1.35 |
| N,N'-bis(2-hydroxyethyl) piperazine | 3.9 | 1.06 |

As may be seen from the results of Table I, the ease of stripping out $SO_2$ improves as the pKa decreases.

The experiments were repeated for some amines but employing 10 minutes of reflux time. The results obtained are set forth in the following Table II:

TABLE II

| Amine | $pKa_2$ | Lean Loading (mole/mole) |
|---|---|---|
| Triethanolamine | 7.76 | 0.92 |
| N,N,N',N'-tetrakis (2-hydroxyethyl -1,3-diaminopropane | 6.9 | 1.82 |
| N,N',N'-trimethyl-N(2-hydroxyethyl) ethylenediamine | 5.7 | 1.56 |
| N,N,N'N'-tetrakis (2-hydroxyethyl) ethylenediamine | 4.9 | 1.41 |

The results of Table I are confirmed by that of Table II.

While ease of regeneration is desirable, a lower limit on useful pKa's is imposed by the requirement of also being able to absorb $SO_2$ efficiently from the gas stream to be treated. This requirement restricts the choice of preferred diamine to those having pKa's above about 5 while purifying stack gases at substantially atmospheric pressure.

Example 3

A synthetic regenerated absorbing medium is prepared by mixing 360 pounds (164 kilograms) of N,N',N'-trimethyl N-(2-hydroxyethyl)ethylenediamine, 133 pounds (60 kilograms) of 98 percent sulphuric acid, and 1080 pounds (491 kilograms) of steam condensate. This mixture exhibits a pH of about 7.76.

This mixture is sprayed into a duct through which a synthetic sulphur dioxide-containing stream is passed. The duct is about 12 inches (30.5 centimeters) in diameter and contains three atomization nozzles in series (nozzle 1 being closest to the outlet of the duct) using atomizing air at about 50 pounds per square inch gauge (3.4 atmospheres). When more than one nozzle is used, the lean solvent is passed through nozzle 1, the recovered solvent from nozzle 1 is then passed to nozzle 2 and then from nozzle 2 to nozzle 3, when used, to effect maximum loading of the solvent. The atomized droplets are believed to be about 20 to 35 microns in diameter. At the outlet end of the duct is a radial fan of about 30 inches (76 centimeters) in size. Spent solvent is recovered from the fan casing and a downstream demister. Sulphur dioxide is mixed into an air stream at 22° C. and 40 percent relative humidity and the stream is passed through the duct. Table III summarizes the test runs, conditions and results. Demisters are present after each of nozzle 3 and nozzle 2 and the solvent SO₂ loadings reported in Table III are based on fluid recovered from the downstream demister.

mole of sulphur dioxide to be absorbed and comprising less than about 80 wt. % of water;
(b) stripping gaseous sulphur dioxide from said spent absorbing medium at a temperature of about 50° to about 110° C. and at least about 30° C. greater than said contact temperature to form a regenerated aqueous absorbing medium;
(c) recovering the gaseous sulphur dioxide; and
(d) recycling said regenerated aqueous absorbing medium to said contacting step.

2. The process of claim 1 wherein said aqueous absorbing medium has a pH in the range of about 6.5 to about 7.5 at the start of said contacting step and has a pH at least about 4.0 at the end of said contacting step.

3. The process of claim 2 wherein said half salt of a diamine has a molecular weight of the free base of less than about 250.

4. The process of claim 3 wherein said half salt of a diamine has a pKa value for the free nitrogen atom of about 5.7 to about 6.7.

5. The process of claim 1 wherein said diamine is a tertiary diamine.

6. The process of claim 5 wherein said tertiary diamine has the general formula:

in which $R_1$ is an alkylene group and each $R_2$ is the same or different alkyl group or hydroalkyl group.

7. The process of claim 6 wherein said alkylene group contains from 2 to 3 carbon atoms.

TABLE III

Pilot Plant Test Results

| NOZZLES OPERATING | | | SO₂, ppmv² | | SOLVENT FEED U.S. GALLONS PER MINUTE | DUCT AIR FLOW ACTUAL CUBIC FEET PER MINUTE | SOLVENT SO₂ LOADING mole SO₂ per mole of amine | | | NOTES |
|---|---|---|---|---|---|---|---|---|---|---|
| 1 | 2 | 3 | IN FEED | AFTER TREATMENT | | | After Nozzle 1 | After Nozzle 2 | After Nozzle 3 | |
| X | | | 1460 | 300 | 0.18 | 350 | 0.19 | | | 1 |
| X | X | | 1350 | 0 | 0.05 | 350 | 0.28 | 0.68 | | |
| X | X | | 2250 | 100 | 0.05 | 350 | 0.30 | 0.85 | | |
| X | X | | 1600 | 40 | 0.05 | 350 | 0.33 | 0.89 | | |
| X | X | X | 2090 | 110 | 0.05 | 350 | 0.20 | 0.53 | 0.76 | 1 |
| X | X | X | 2040 | 0 | 0.15 | 350 | 0.11 | 0.37 | 0.60 | |
| X | X | | 1710 | 0 | 0.15 | 410 | 0.16 | 0.36 | | |
| X | | | 1400 | 100 | 0.15 | 430 | 0.31 | | | |

¹Not run long enough to equilibrate solvent SO₂ loading.
²Accuracy of SO₂ concentration is ±50 ppmv.

It is claimed:

1. A cyclic process for the removal of sulphur dioxide from a sulphur dioxide containing gas stream using an absorbent medium and for the regeneration of the absorbent medium, which comprises:
(a) contacting said gas stream at substantially atmospheric pressure with an aqueous absorbing medium containing a water-soluble half salt of a diamine at a temperature of from about 10° to about 60° C. to absorb sulphur dioxide from said gas stream in amounts of at least about 100 g of sulphur dioxide per kg of absorbing medium, said diamine in free base form having a molecular weight of less than about 300 and said diamine in half salt form having a pKa value for the free nitrogen atom of about 5 to about 7.3, said aqueous absorbing medium containing at least 1 mole of water for each 8. The process of claim 7 wherein said alkylene group is a straight chain alkylene group.

9. The process of claim 8 wherein said alkyl group is methyl.

10. The process of claim 8 wherein said hydroxyalkyl group is a 2-hydroxyethyl group.

11. The process of claim 5 wherein said tertiary diamine is selected from the group consisting of N,N',N'-(trimethyl)-N-(2-hydroxyethyl)-ethylene diamine and N,N,N',N'-tetramethylethylene diamine.

12. The process of claim 1 wherein said diamine is piperazine.

13. The process of claim 5 wherein said half salt is the sulphite salt of the tertiary diamine.

14. The process of claim 5 wherein said half salt is the sulfate salt of the tertiary amine.

15. The process of claim 1 wherein said proportion of water present in the aqueous absorbing medium is from about 25 to about 50 wt. %.

16. The process of claim 1 wherein said contact is effected at a temperature of about 10° to about 50° C. and said stripping is effected at a temperature of about 70° to about 90° C.

17. The process of claim 1 wherein the ratio of $SO_2$ absorbed in said contacting step to that desorbed in said stripping step is approximately 1:1.

18. The process of claim 17 wherein said stripping is effected by steam stripping.

19. The process of claim 17 wherein said stripping is effected by passing an inert gas through said spent absorbing medium.

20. The process of claim 1 wherein heat stable salts are removed from said regenerated aqueous absorbing medium.

21. A cyclic process for the removal of sulphur dioxide from a sulphur dioxide-containing gas stream using an absorbing medium and for the regeneration of the absorbing medium, which comprises;

(a) contacting said gas stream with an absorbing medium containing (i) water in an amount of at least about 1 mole for each mole of sulphur dioxide to be absorbed up to about 80 weight percent of the medium and (ii) amine salt absorbent having at least two amine groups, at least one of which is a salt and at least one of which is, when in its free form, a group having a pKa in an aqueous medium at 25° C. of about 4.5 to 7.3 at a temperature up to about 60° C. sufficient to enable under reference conditions of a partial pressure of 2 mm Hg of sulphur dioxide, at least about 0.5 mole of sulphur dioxide to be reversibly absorbed per mole equivalent of sorbing nitrogen, said absorbent being in an amount sufficient to provide a spent absorbing medium containing at least about 100 grams of sulphur dioxide per kilogram of absorbing medium;

(b) removing gaseous sulphur dioxide from the spent absorbing medium at a temperature and pressure sufficient to remove at least about 70 mole percent of the sulphur dioxide absorbed in the contacting step, in the spent absorbing medium to provide a regenerated medium containing absorbent having at least one nitrogen as an amine salt and at least one free sorbing nitrogen; and (c) recovering the gaseous sulphur dioxide; and (d) recycling the regenerated absorbing medium to the contacting step.

22. The process of claim 21 in which the pH of the regenerated absorbing medium is between about 6.5 to 7.5.

23. The process of claim 21 in which the pKa of the sorbing nitrogen is between about 5 and 7.3.

24. The process of claim 21 in which the contacting temperature is about 10° to 50° C.

25. The process of claim 21 in which the molecular weight of the amine salt absorbent when in the free amine form is less than about 300.

26. The process of claim 21 in which the contacting is effected with the absorbing medium in finely divided droplets.

27. The process of claim 21 in which the amine groups of the amine salt absorbent are secondary or tertiary amines.

28. The process of claim 27 in which at least one amine group of the amine salt absorbent contains at least one hydroxyalkyl substituent.

29. The process of claim 21 in which the pH of the spent absorbing medium is about 4 to 6.

30. The process of claim 21 in which anion of the amine salt absorbent comprises at least one of sulphate, chloride, thiosulfate, dithionate, trithionate, and pyrosulphite.

* * * * *